United States Patent
Goodman et al.

(10) Patent No.: US 6,654,733 B1
(45) Date of Patent: Nov. 25, 2003

(54) FUZZY KEYBOARD

(75) Inventors: Joshua Goodman, Redmond, WA (US); Daniel Venolia, Kirkland, WA (US); Xuedong Huang, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/484,095

(22) Filed: Jan. 18, 2000

(51) Int. Cl.[7] .............................. G06F 9/44; G06N 7/02; G06N 7/06
(52) U.S. Cl. .............................. 706/52; 706/11; 706/46
(58) Field of Search ................................ 706/52, 11, 46

(56) References Cited

U.S. PATENT DOCUMENTS 5,718,590 A * 2/1998 Choate ..................... 434/227
5,963,671 A * 10/1999 Comerford et al. ......... 382/230

OTHER PUBLICATIONS

Karen Kukich, Techniques for Automatically Correcting Words in Text; Dec. 1992; ACM; vol. 24, No. 4; 377–439.*
Hermann Ney, Ute Essen, Reinhard Kneser, On structuring probabilistic dependences in stochastic language modelling, Computer Speech & Language 8, 1–38, 1994.
I. Scott MacKenzie, Shawn Zhang, The design and evaluation of a high–performance soft keyboard, CHI '99, Pittsburgh, PA, May 15–20, 1999.
P. Vale, U.S. patent application entitled Dynamic Keyboard, Ser. No. 09/146,769, Sep. 3, 1998.
Dario D. Salvucci, Inferring Intent in Eye–Based Interfaces: Tracing Eye Movements with Process Models, CHI '99, Pittsburgh, PA, May 15–20, 1999.
S. Chen and J. Goodman, An Empirical Study of Smoothing Techniques for Language Modeling, Computer Science Group, Harvard University, TR–10–98, Aug. 1998.
Andrew W. Golding, Yves Schabes, Combining Trigram– based and Feature Based Methods, Mitsubishi Technical Report, TR–96–03a, May 1996.
John W. Miller, Fil Alleva, Evaluation of a Language Model using a Clustered Model Backoff, Proccedings of ICSLIP 96, pp. 390–393, 1996.

* cited by examiner

*Primary Examiner*—Paul P. Gordon
*Assistant Examiner*—Joseph P. Hirl
(74) *Attorney, Agent, or Firm*—Westman, Champlin & Kelly, P.A.; S. Koehler (57) ABSTRACT

Fuzzy keyboards, to determine a most-likely-to-be-intended keystroke or keystrokes, are disclosed. In one embodiment, a method adds each of one or more keys to each of a current list of key sequence hypotheses, to create a new list of key sequence hypotheses. The method determines a likelihood probability for each hypothesis in the new list, and removes any hypothesis failing to satisfy any of one or more thresholds. The most likely key sequence of the new list may then be displayed. Some embodiments of the invention relate specifically to soft keyboards, while other embodiments relate specifically to real, physical and hard keyboards.

36 Claims, 6 Drawing Sheets

FUZZY KEYBOARD

RELATED APPLICATION

The present application is related to the cofiled, copending, and co-assigned case entitled "Predictive Keyboard" having U.S. patent application Ser. No. 09/484,079.

FIELD OF THE INVENTION

This invention relates generally to devices having keyboards, such as personal-digital-assistant (PDA) devices having soft keyboards as well as desktop and laptop computers having real, physical keyboards, and more particularly to determining in conjunction with such keyboards a most likely intended-to-be-typed keystroke or sequence of keystrokes.

BACKGROUND OF THE INVENTION

Small computerized devices that fit into the palm of one's hand, generally referred to as personal-digital-assistant (PDA) devices, have become increasingly popular. They allow users to look up and record information where computer access is inconvenient, such as when in one's car, while shopping at the mall, during a business meeting, etc. Unlike a typical desktop or laptop computer, which has an actual physical, or "real," keyboard for text and data entry, a PDA device usually only has a small number of buttons, and a small touch-sensitive area on which a pen-like implement called a stylus can be used. For text entry on such a device, the user is able to write letters or symbols corresponding to letters on the touch-sensitive area with the stylus, which the device attempts to recognize.

However, for a variety of reasons, some users prefer not to input text into these devices in this manner. Therefore, most PDA devices also permit a second form of text and data entry. An image of a regular keyboard is displayed on the small display of a PDA device, such that a user is able to select which key to "type" next by tapping the stylus on the part of the image of the keyboard corresponding to the desired key. Such an image of a keyboard being displayed on the display of a device such as a PDA device, to provide for text and data entry on the part of the user by tapping the parts of the image corresponding to keys of the keyboard, is known as a "soft" keyboard.

A disadvantage with such soft keyboards is, however, that the displayed keys of the keyboard on the display of the PDA device are very small, since the display of the device as well as the device itself are small. This means that users are apt to tap incorrect keys, especially when "typing" quickly, and also that users are apt to type more slowly using soft keyboards, because of the dexterity required in order to achieve a high accuracy rate when typing. This limits the usefulness of these PDA devices, since they cannot very conveniently be used for quick and/or large amounts of text and data entry. For this and other reasons, there is a need for the present invention.

SUMMARY OF THE INVENTION

The invention relates to fuzzy keyboards, to determine a most likely intended-to-be-typed keystroke or keystrokes. In one embodiment, a computer-implemented method adds each of one or more keys to each of a current list of key sequence "hypotheses," to create a new list of key sequence hypotheses, upon a key press event. For a soft keyboard, for example, a key press event may be the actuation of a location within the soft keyboard rendered on a touch-sensitive display. For a hard keyboard, for example, a key press event may be the actuation of an actual key on the keyboard. The method determines a likelihood probability for each hypothesis in the new list, and then removes any hypothesis that fails to satisfy any of one or more thresholds. In one embodiment, the most likely key sequence of the new list is displayed.

In another embodiment specifically relating to soft keyboards, a computerized system includes a touch-sensitive display, a soft keyboard rendered thereon, and a computer program. The computer program detects actuation of a location on the soft keyboard, and based at least thereon determines a most likely intended-to-be-typed key on the soft keyboard. In another embodiment specifically relating to hard keyboards, a computerized system includes a keyboard and a computer program. The computer program detects actuation of a key on the keyboard, and determines a most likely intended-to-be-typed key of the keyboard, based on at least the key actuated and either a key sequence of keys already determined to have been typed, a list of key sequence hypotheses, or both.

Embodiments of the invention provide for advantages not found within the prior art. With respect to hard keyboards, the user may be typing fast, for example, and press the "d" key instead of the "e" key. However, the most likely key sequence hypothesis may be such that the typing of the "e" key is much more probable than the typing of the "d" key. As an example, the user may have initially typed "Th" prior to the "d" key. Because the "d" key is close to the "e" key, and few words begin "Thd" while many words begin "The," and also because the user was typing fast, the key sequence "The" may be displayed instead of "Thd."

With respect to soft keyboards, keys that are determined as more likely to be entered by the user have a greater probability that they are intended to be typed when the user actuates a location close to those keys. For example, if the user actuates the soft keyboard in the vicinity between the "d" and the "f" keys, and the most likely key sequence hypothesis is such that the "d" key is more likely than the "f" key to have been typed by the user, then the "d" key may be displayed. In some embodiments of the invention, past keystrokes may also be changed, up to a predetermined number of keystrokes before the current keystroke.

Furthermore, it is noted that in one embodiment of the invention, the fuzzy keyboard as described herein can be implemented in conjunction with the predictive keyboard described in the copending, coassigned, and cofiled application entitled "Predictive Keyboard" having U.S. patent application Ser. No. 09/484,079. However, the invention itself is not so limited.

The invention includes computer-implemented methods, machine-readable media, computerized devices, computerized systems, and computers of varying scopes. Other aspects, embodiments and advantages of the invention, beyond those described here, will become apparent by reading the detailed description and with reference to the drawings.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as processing or computing or calculating or determining or displaying or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Operating Environment

Figure 1:
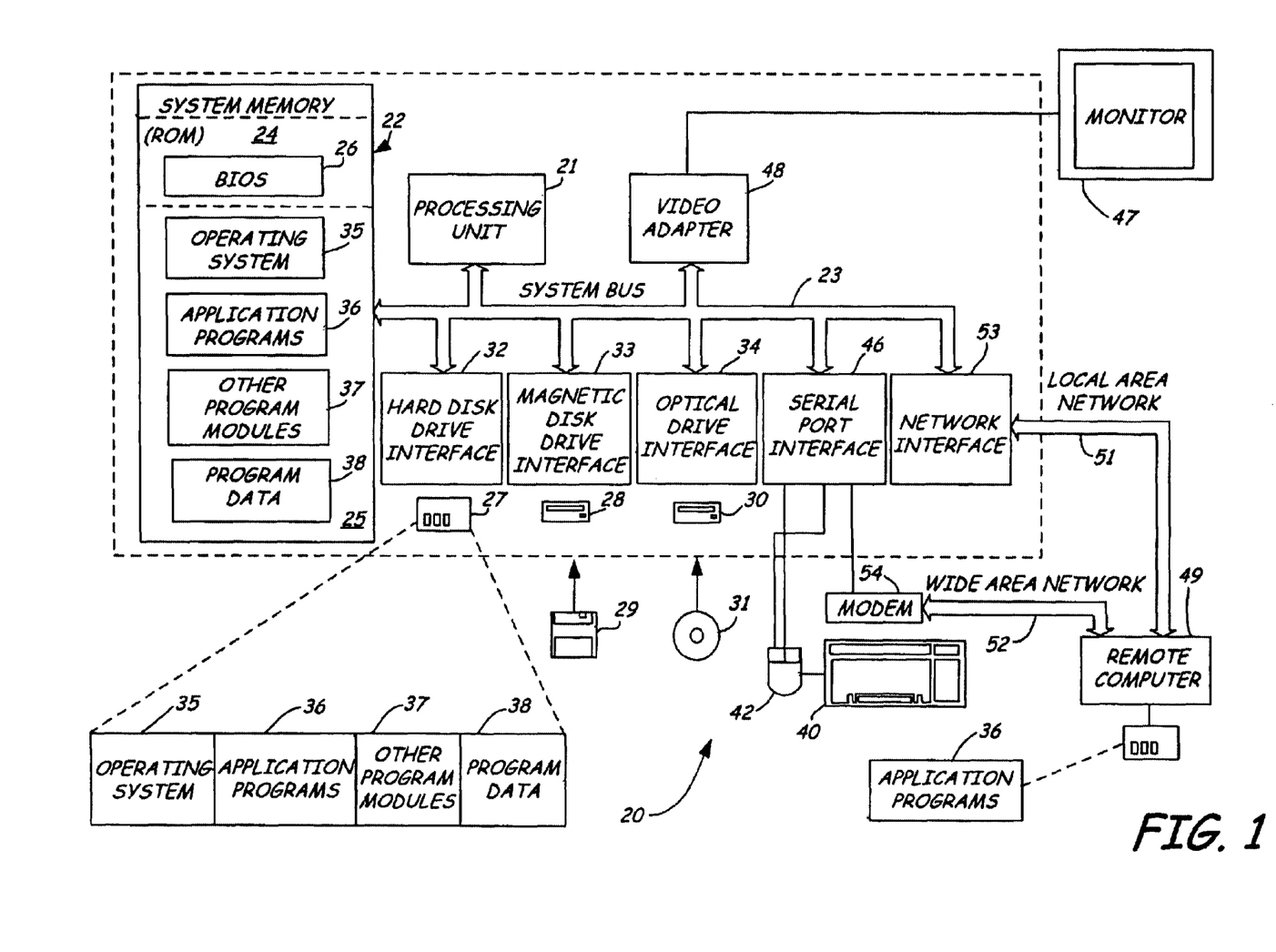
FIG. 1 is a diagram of an operating environment in conjunction with which embodiments of the invention can be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PC's, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components including the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internet, which are all types of networks.

Figure 2:
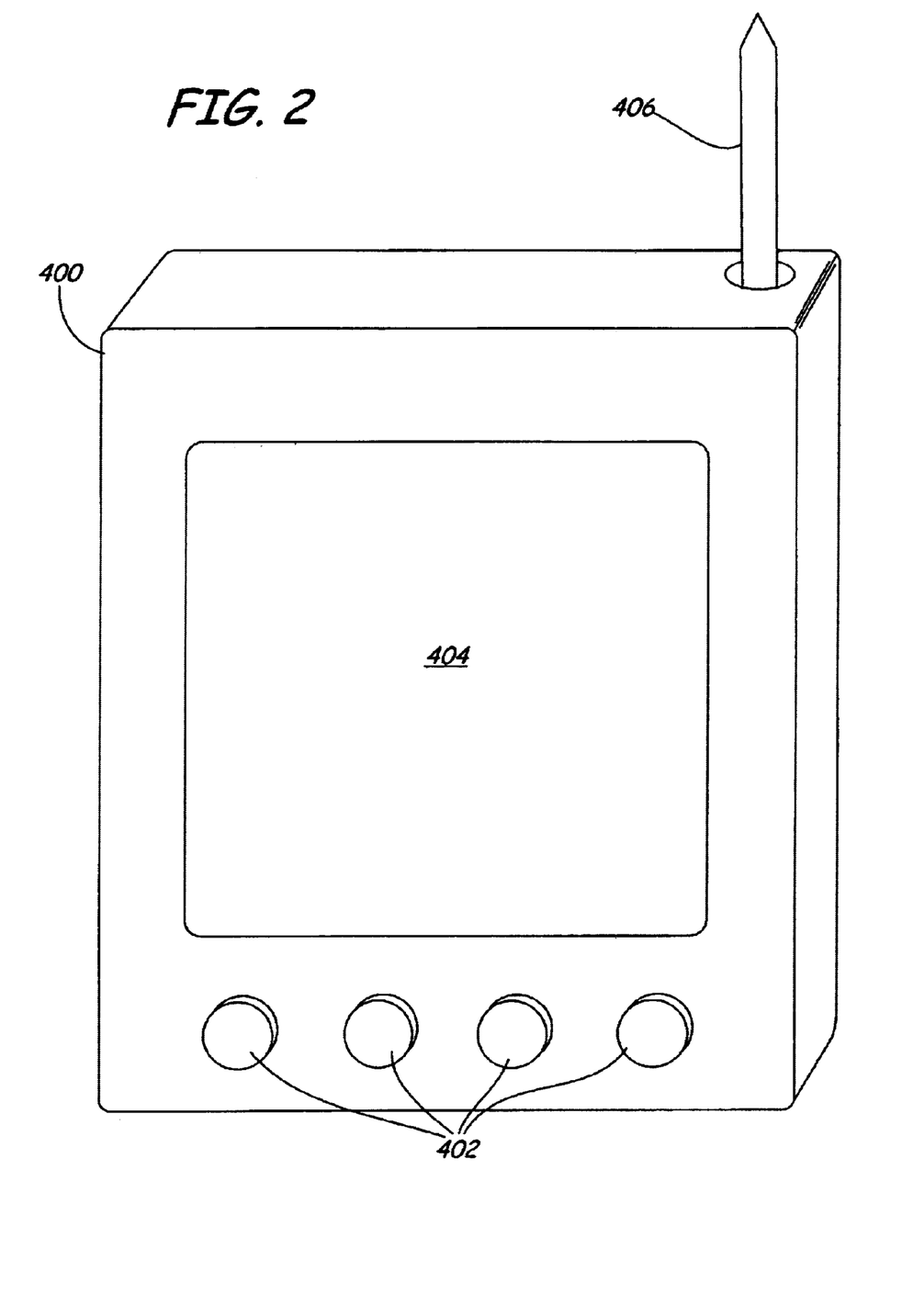
FIG. 2 is a diagram of a representative personal-digital-assistant (PDA) device in conjunction with which embodiments of the invention may be practiced.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.
Operation In this section of the detailed description, the operation of varying embodiments of the invention described. First, a representative personal-digital-assistant (PDA) device in conjunction with which embodiments of the invention may be practiced is shown in FIG. 2. The device 400 includes a number of controls 402 and a touch-sensitive display 404. The display 404 allows for both the device 400 to display information thereon, as well as receive input via the user tapping or writing against it, such as with an implement like the stylus 406. The stylus 406 as shown in FIG. 2 can be stored in a slot within the device 400 itself. Depending on the particular PDA device, the controls 402 can cause any of a number of different functionality when pressed. For example, in one type of PDA device, actuating a given control 402 causes an application program associated with that control to be run on the device, such as a note pad program, a calendaring program, etc.

The invention is not limited to a PDA device such as that shown in FIG. 2, and the device of FIG. 2 is shown for illustrative purposes only. In particular, embodiments of the invention are amenable to application to any PDA device, such as (but not limited to) PDA devices that run the PalmOS®, such as those available from HandSpring, Inc. and Palm Computing, Inc., as well as such devices that run the Microsoft® Windows® CE operating system, such as those available from Casio, Hewlett-Packard, Compaq, and other vendors. Embodiments of the invention are also amenable to application to standard desktop computers, such as that described in the previous section of the detailed description, as well as other devices, such as devices commonly referred to as electronic books, or e-books.

The PDA device of FIG. 2 shows a display 404 that is touch-sensitive, and therefore allows for output to be displayed thereon, as well as input to be entered thereon. However, other PDA devices may be such that only a part of their displays are able to accept input, while still other PDA devices may have a separate touch-sensitive area apart from their display for input. All of these alternative devices are nevertheless amenable to application to embodiments of the invention.

Figure 3:
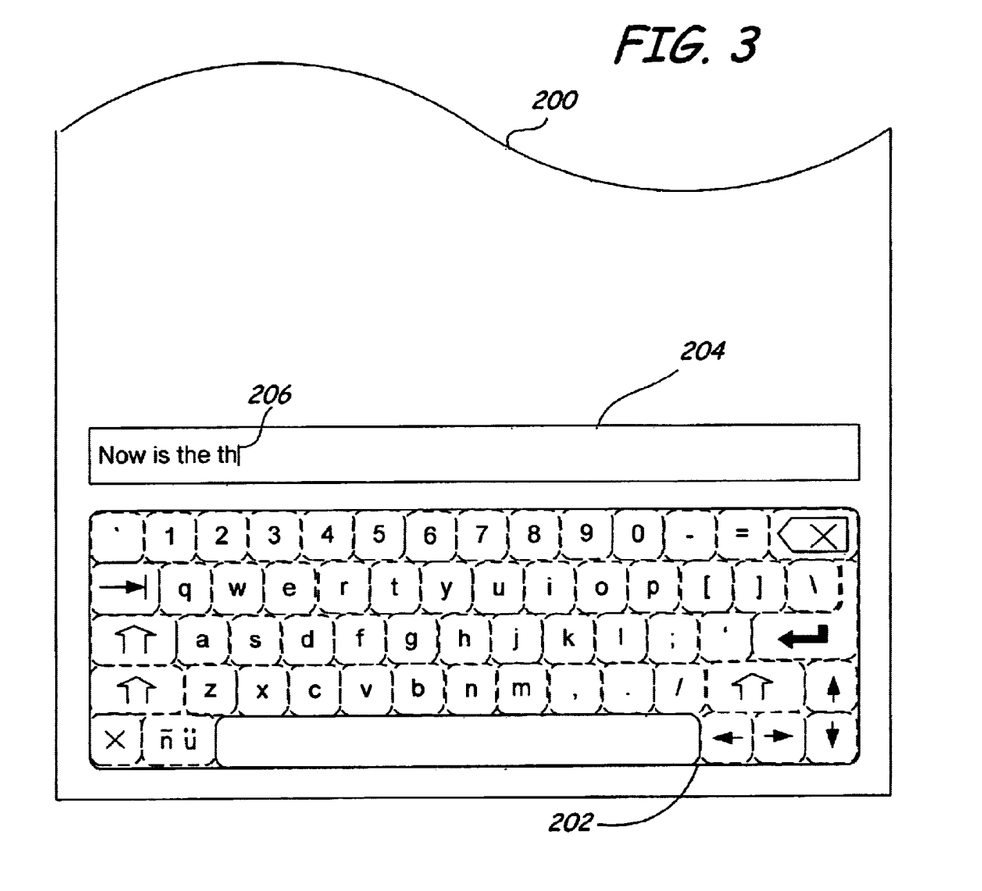
FIG. 3 is a diagram of a soft keyboard in conjunction with which embodiments of the invention may be practiced.

Referring next to FIG. 3, a diagram of a soft keyboard in conjunction with which embodiments of the invention may be practiced is shown. The display area 200 is one part of a display of a device, such as the display 404 of the device 400 of FIG. 2. The display area 200 includes a soft keyboard 202, and a text-entry box 204. The soft keyboard 202 is an image of a real keyboard displayed on the display 404. Because it is not an actual, physical keyboard, the keyboard 202 is referred to as a "soft" keyboard. "Typing" on the keyboard 202 means tapping on the parts of the display on which the desired keys of the keyboard 202 are displayed, with a stylus or other implement, to cause the device to recognize that inputs have been made. The resulting keys that have been typed are shown in the text-entry box 204.

For example, in the diagram of FIG. 3, the user has tapped the parts of the display screen corresponding to the keyboard keys SHIFT, n, o, w, space, i, s, t, h, e, space, t, h, such that the key sequence "Now is the th" is shown within the text-entry box 204. The indicator 206 shows where the next-entered key will be inserted within the text-entry box 204. If the user has made a mistake, he or she can type the backspace key to erase characters immediately to the left of the indicator 206, or type the cursor-left key to cause the indicator 206 to move to the left within the key sequence shown in the text-entry box 204. In other words, the soft keyboard 202 operates substantially as a real, physical keyboard otherwise does, and as known within the art.

In implementation in a PDA device, the soft keyboard 202 of FIG. 3 may measure only three inches wide by one inch high, for example. That is, the soft keyboard 202 consumes only a part of the space of the display area 200, which is itself typically relatively small. Thus, individual keys on the soft keyboard 202 are quite small, making for inconvenient typing on the keyboard. Users are apt to tap the incorrect key when attempting to type a desired key sequence, as has been described in the background section. Embodiments of the invention attempt to overcome this disadvantage of small, palm-sized devices.

As particularly shown in the soft keyboard 202 of FIG. 3, alphanumeric and punctuation keys have dotted-line boundaries. This is to indicate that these boundaries are fuzzy, as opposed to rigid. When a user presses between the "q" and the "w" keys, for example, the actual letter indicated to be pressed is determined.by an embodiment of the invention, based on, for example, the location where the soft keyboard 202 was actually actuated (i.e., closer to the "q" key, or closer to the "w" key), the sequence of letters already determined to have been typed by the user, and/or the typing speed of the user, as is described in greater detail in subsequent sections of the detailed description.

It is noted that the invention is not limited to embodiments where a soft keyboard has at least some of its keys shown as fuzzy via dotted line boundaries, and furthermore is not limited to a soft keyboard having at least some of its key shown as fuzzy at all. On displays capable of showing gray-scale, for example, the boundaries can be such that a circular region immediate to a given key label (such as "a", "b", "c", etc.) is displayed very dark, and circular bands are displayed progressively lighter as they recede in distance away from the given key label, to indicate that the boundaries between keys are fuzzy. Furthermore, in other embodiments of the invention, the boundaries between keys can be shown as solid lines—that is, not fuzzy at all. In other embodiments of the invention, all the keys, including action-oriented keys such as backspace, enter, shift, etc., may have fuzzy boundaries, in addition to or in lieu of alphanumeric and punctuation and other keys, such as the space bar, etc.

An example is illustrative to understanding how an embodiment of the invention operates, although the invention itself is not limited to this example. The case in which the user of a soft keyboard presses the stylus between the letters "e" and "w" on the soft keyboard, in the context where a space followed by the letters "t" and "h" have already been indicated to the user to be entered (for example, being shown in the box 204 of FIG. 3), is considered. Given the frequency of the sequence "_the", where "_" indicates a space, versus the sequence "_thw", the letter typed by the user is likely to be determined to be "e".

However, consider the case in which the user hits somewhat closer to the "w" than to the "e" key, given the same context. Since very few words begin "_thw", it is still likely that the user intended to enter "_the" instead of "_thw". Thus, even though the user actuated closer to the "w" key than the "e" key, the key sequence "_the" may still be displayed. However, if the user instead actuates somewhere closer to the "r" key rather than the "e" key, since many worlds begin with "_thr", it may be determined that the user likely intended to type an "r".

In some embodiments, past keys indicated to have been typed by the user can also change, based on new keys that are determined as likely to have been typed by the user. For example, in the previous case just described, where the key sequence "_thr" was determined as most likely to have been typed by the user, if the next key typed is unambiguously a space, the key sequence may be changed to "_the_"—that is, the "r" previously determined as most likely to be entered has been changed to an "e". This is because the key sequence "_the_" is significantly more likely to have been intended by the user than the nonsense word "_thr_".

However, as another example, if the user actuates on the far left side of the "w" key on the soft keyboard, so far away that it is unlikely he or she had intended to type the "e" key, the sequence "_thw_" may nevertheless still be displayed, despite its seemingly nonsense nature. That said, if the user's typing speed has been extremely fast when the "w" key was actuated on the soft keyboard, this would increase the likelihood that the user has made a mistake—the fast typing speed indicating error-prone typing on the part of the user—and again an embodiment of the invention may determine that the user had intended the sequence "_the_".

It is noted that embodiments of the invention are also amenable to a physical—that is, a real or "hard"—keyboard, as well as to a soft keyboard. Such physical keyboards are likely to be found on more traditional computing devices such as laptop and desktop computers. In these embodiments, while the location of actuation on the keyboard cannot be determined—there is no correspondence on a physical keyboard to the event on a soft keyboard of actuating "between" the "q" and the "w" keys, for example—the context of a key press by a user, as well as the typing speed and other attributes and characteristics can be used to determine a key or key sequence that the user is likely to have intended to be typed.

The manner by which embodiments of the invention operate has been described. In the next section of the detailed description, the manner by which embodiments of the invention implement this operation is described in a more detailed manner than presented in this section.

Hypothesizing an Intended-to-Have-Been-Typed Key Sequence by the User

In this section of the detailed description, the manner by which an intended-to-have-been-typed key sequence or sequences of one or more keys, by the user, is hypothesized by an embodiment of the invention is described. The invention is not limited to the manner described herein, however. In particular, the manner described herein relies on a statistical model, such as a statistical character model or a statistical word model, as will be described. In one embodiment, the model uses as input the key sequence(s) that has already been hypothesized as intended entered by the user. More specifically, the "context" of the key sequence is used as an input to a statistical; that is, the keys of the key sequence that have already been entered, and that lie to the left of the insertion indicator, are used as input. In other embodiments, the model also considers the actual key actuated by the user, in the case of a real or physical keyboard, the location actuated on a touch-sensitive display by the user, in the case of a soft keyboard rendered on the display, and/or the typing speed of the user.

In general, embodiments of the invention are such that a key sequence is attempted to be found that satisfies:

$$\arg\max_{l_1...l_n} P(l_1...l_n) \times P(x_1...x_n, y_1...y_n, s_1...s_n | l_1...l_n)$$

Typically, we will assume independence between $x_i$, $y_i$, $s_i$, given $l_i$ and the other x's, y's, s's and l's:

$$\arg\max_{l_1...l_n} P(l_1...l_n) \times \prod_{i=1}^{n} P(x_i, y_i, s_i | l_i)$$

However, as we will describe below, this independence assumption is not necessary. Note that some of the $l_i$ may indicate the "null" character, in the case where we believe that the character was inadvertently inserted.

In the above, $l_i$ indicates the i'th letter typed (of n total); $x_i$ indicates the x position at the i'th key down; $y_i$ indicates the y position at the i'th key down; and $s_i$ indicates the speed at the i'th key down, i.e. the distance traveled from the previous key down divided by the time since the last key down. Thus, the most probable letter sequence given the observed key presses is attempted to be found, where this probability is equal to the a priori probability of the sequence, $P(l_1 \ldots l_n)$ times the product of the probabilities of each key press location and speed given the letter. The first part is the probability of the letter sequence $P(l_1 \ldots l_n)$. This letter sequence probability can be computed using language modeling techniques known within the art.

In some embodiments, a statistical character-based model is used to determine the key sequence. In particular, in a trigram model, the following is used:

$$P(l_1...l_n) = \prod_{i=1}^{t} P(l_i | l_1 ... l_{i-1}) \approx \prod_{i=1}^{t} P(l_i | l_{i-2} l_{i-1})$$

Thus, the probability of a letter sequence is equal to the probability of the first letter times the probability of the second letter given the first, times the probability of the third given the first two, and so on, through the probability of the last letter given all preceding letters. A trigram approximation is then made, that the probability of a letter depends only on the probability of the preceding two letters. Finally, the conditional probability of $P(l_i|l_{i-2}l_{i-1})$ is determined. Assuming that $C(l_{i-2}l_{i-1}l_i)$ represent the number of times the sequence $l_{i-2}l_{i-1}l_i$ occurs in some training text, $$P(l_i|l_{i-2}l_{i-1}) \approx \frac{C(l_{i-2}l_{i-1}l_i)}{C(l_{i-2}l_{i-1})}$$

This approximation may be too coarse, however, such that in one embodiment the following approximation is used:

$$P(l_i|l_{i-2}l_{i-1}) \approx \lambda \frac{C(l_{i-2}l_{i-1}l_i)}{C(l_{i-2}l_{i-1})} + \mu \frac{C(l_{i-1}l_i)}{C(l_{i-1})} + (1-\lambda-\mu)\frac{C(l_i)}{\sum_l C(l)}$$

where $0 \leq \lambda \leq 1$, $0 \leq \mu \leq 1$ and $0 \leq \lambda+\mu \leq 1$. These values can be optimized experimentally using techniques known within the art, such as those described in the reference Stanley F. Chen and Joshua Goodman, "An Empirical Study of Smoothing Techniques for Language Modeling," Technical Report number TR-10-98, Harvard University, 1998. This approximation smoothes the probability distribution. Those of ordinary skill within the art can recognize that other, more effective smoothing techniques also can be used, such as caching and clustering techniques. In one embodiment, word-based and cluster-based models are combined to predict in-vocabulary words with letter-based models to predict out-of-vocabulary words. While a trigram model can be used in some embodiments of the invention, in other embodiments, a more general n-gram model is used, where n equals, for example, four, five, six, seven, or higher.

How a statistical word-based language model is used in accordance with embodiments of the invention to predict the next letter is now described. Let $w_{n-2}$ $w_{n-1}$ represent the previous two words, and let $l_1 \ldots l_{k-1}$ represent the first k-1 letters of the next word. Then, $$P(l_k|w_{n-2}w_{n-1}l_1\ldots l_{k-1}) = \frac{\sum_{w|prefix(w,k)=l_1\ldots l_k} P(w|w_{n-2}w_{n-1})}{\sum_{w|prefix(w,k-1)=l_1\ldots l_{k-1}} P(w|w_{n-2}w_{n-1})}$$

Furthermore, there are several techniques known within the art for combining a word-based model with a letter-based model, including taking the weighted sum of a statistical letter model and a statistical word model. In one embodiment, the following technique is used. In a conventional word n-gram model, only words in some fixed vocabulary of the most frequent words (60,000 words is typical) are modeled. All other words are not modeled. Instead, letters are treated as words, and for any words not in the vocabulary, they are treated as a letter sequence, terminated by punctuation or space. Let $w_1 \ldots w_k$ represent the context. If the user typed "the gvxy cat" then $w_1$=the, $w_2$=g, $w_3$=v, $w_4$=x, $w_5$=y, $w_6$=<space>, and $w_7$=cat. This context can then be used with smoothing techniques known in the art to produce a model of all possible letter sequences. Other language modeling techniques known within the art, such as caching and clustering, can also be used.

Now, let $P_{letter}(l_k|w_{n-2}w_{n-1}l_1\ldots l_{k-1})$ be a conventional n-gram model that gives the probability of the next letter, given the previous letter and the previous words, and assuming that the word being typed is out-of-vocabulary. Similarly, let $P(w_n|w_{n-2}w_{n-1})$ be a conventional word-based n-gram model. These models can be combined to determine $P(l_k|w_{n-2}w_{n-1}\ldots l_{k-1})$. Let $P(OOV|w_{n-2}w_{n-1})$ be the probability that the next word will be out-of-vocabulary, given the previous two words (or last two letters of the previous word, if the previous word was out-of-vocabulary.) In this combined model, the probability that the word being typed is in the vocabulary, $P_{word}$ given a history $w_{n-2}w_{n-1}l_1\ldots l_{k-1}$ is first determined.

Let $$P_{word} = \frac{(1 - P(OOV|w_{n-2}w_{n-1}))\sum_{w|prefix(w,k-1)=l_1\ldots l_{k-1}} P(w|w_{n-2}w_{n-1})}{P(OOV|w_{n-2}w_{n-1})P_{letter}(l_1\ldots l_{k-1}|w_{n-2}w_{n-1}) + (1 - P(OOV|w_{n-2}w_{n-1}))\sum_{w|prefix(w,k-1)=l_1\ldots l_{k-1}} P(w|w_{n-2}w_{n-1})}$$

This is the probability that the symbol that is being spelled out is a word in the vocabulary, versus a sequence of letters that are out of vocabulary. Thus, the complete probability for $P(l_k|w_{n-2}w_{n-1}l_1\ldots l_{k-1})$ is $$P(l_k|w_{n-2}w_{n-1}l_1\ldots l_{k-1}) = (1 - P_{word}) \times P_{letter}(l_k|w_{n-2}w_{n-1}l_1\ldots l_{k-1}) + P_{word} \times \frac{\sum_{w|prefix(w,k-1)=l_1\ldots l_k} P(w|w_{n-2}w_{n-1})}{\sum_{w|prefix(w,k-1)=l_1\ldots l_{k-1}} P(w|w_{n-2}w_{n-1})}$$

The individual probabilities, $P_{letter}(l_k|w_{n-2}w_{n-1}l_1\ldots l_{k-1})$ and $P(w|w_{n-2}w_{n-1})$ desirably use n-gram approximations and smoothing, as well as any other standard language modeling techniques known within the art. It is noted that while this description covers letters, in other embodiments of the invention keys are modeled, including punctuation keys and number keys, and also potentially keys such as shift, enter, tab, ctrl and backspace.

The second part of the model is the key position model, $P(x_i, y_i, s_i|l_i)$. Several different ways can be used to model this probability. Let $N(\mu, \sigma)$ represent a Gaussian distribution with mean $\mu$ and standard deviation $\sigma$. Then, $$P(x_i, y_i, s_i|l_i) = N(x_i; \mu_{x|l_i}, \sigma_{x|l_i}) \times N(y_i; \mu_{y|l_i}, \sigma_{y|l_i}) \times N(s_i; \mu_{s|l_i}, \sigma_{s|l_i})$$

It is noted that $\mu_{x|l_i}$ does not tend to be the center of the key; in general, it is shifted slightly towards the lower-center of the keyboard. The means and variances can be determined empirically from data collection, or assumptions based on averages can be used.

In other embodiments of the invention, a mixture of Gaussians (or double-exponentials) can be used for some keys, particularly the space bar, as determined by known techniques, such as the EM approach. Some approaches may wish to model correlations between $x_i$, $y_i$, and $s_i$, by for instance, using multi-dimensional Gaussians with non-diagonal covariance matrices; this is especially useful for modeling the correlation between $x_i$ and $y_i$. The means and standard deviations of key positions, either separately, or together, can be adapted in one embodiment of the invention, using a technique such as the EM approach, to individual users. A language model in one embodiment can also be interpolated, such as linearly, with less specific language models, such as uniform, unigram and bigram letter models, in addition to or in lieu of the smoothing). If the weight of these less specific algorithms is set very high, the keyboard becomes less and less fuzzy. In particular, if all the weight is placed on the uniform or unigram models, the keyboard is not fuzzy at all: there is an exact, unchanging mapping from locations to keys. Using a technique such as the EM approach, these interpolation weights can be adapted, so that users with specific tasks that do not fit a given language model will notice less (or no) degradation from the fuzzy keyboard.

Timing information, such as the typing speed of the user, can also be input into the models described above. For example, the standard deviations can be made in one embodiment dependent on the speed. If $s_i$ is fast, then this increases standard deviations in one embodiment. This can be done in one with a table of $\sigma_x$ and $\sigma_y$ for each of a range of speeds, such as 2 ranges. Furthermore, in one embodiment, a double exponential probability is used instead of a Gaussian estimate. The double exponential probability formula is of the following form:

$$P(x; \mu, \sigma) = \frac{1}{2\sigma/\sqrt{2}} \exp\left(\frac{-|x - \mu|}{\sigma/\sqrt{2}}\right).$$

For some words, a fuzzy keyboard may have poor performance. For instance, a user might find it difficult to enter the key sequence "_thw_" because the system might consistently change this sequence to "_the_". This issue can be addressed by a number of techniques, three of which are now described. First, after a backspace key is pressed, for several characters, such as three, a standard soft keyboard is used in which the boundary or closest key information is used to determine the key press. Second, after a sufficiently long pause, say 0.8 seconds, it is assumed that the user has carefully typed this key and again boundary or closest key information is used. Third, a caching language model can be used. This means that once the user has successfully entered a key sequence such as "_thw_" (e.g., by using the backspace key), the probability of this sequence is raised, so that it can be entered in the future.

The techniques described herein are not limited to use with soft keyboards. Consider, for instance, the case where a user of a conventional, hard (or soft) keyboard inputs a key-sequence "thye". If the timing of this sequence were t h ye where we have indicated relative times by distance, then, depending on context, we might assume that the user had intended to enter the sequence "they" and had transposed the letters. If the timing of this sequence was t hy e then we might assume that the intended sequence was "the" and that the "y" was inserted by pressing the "h" and "y" keys simultaneously.

Methods

Figure 4:
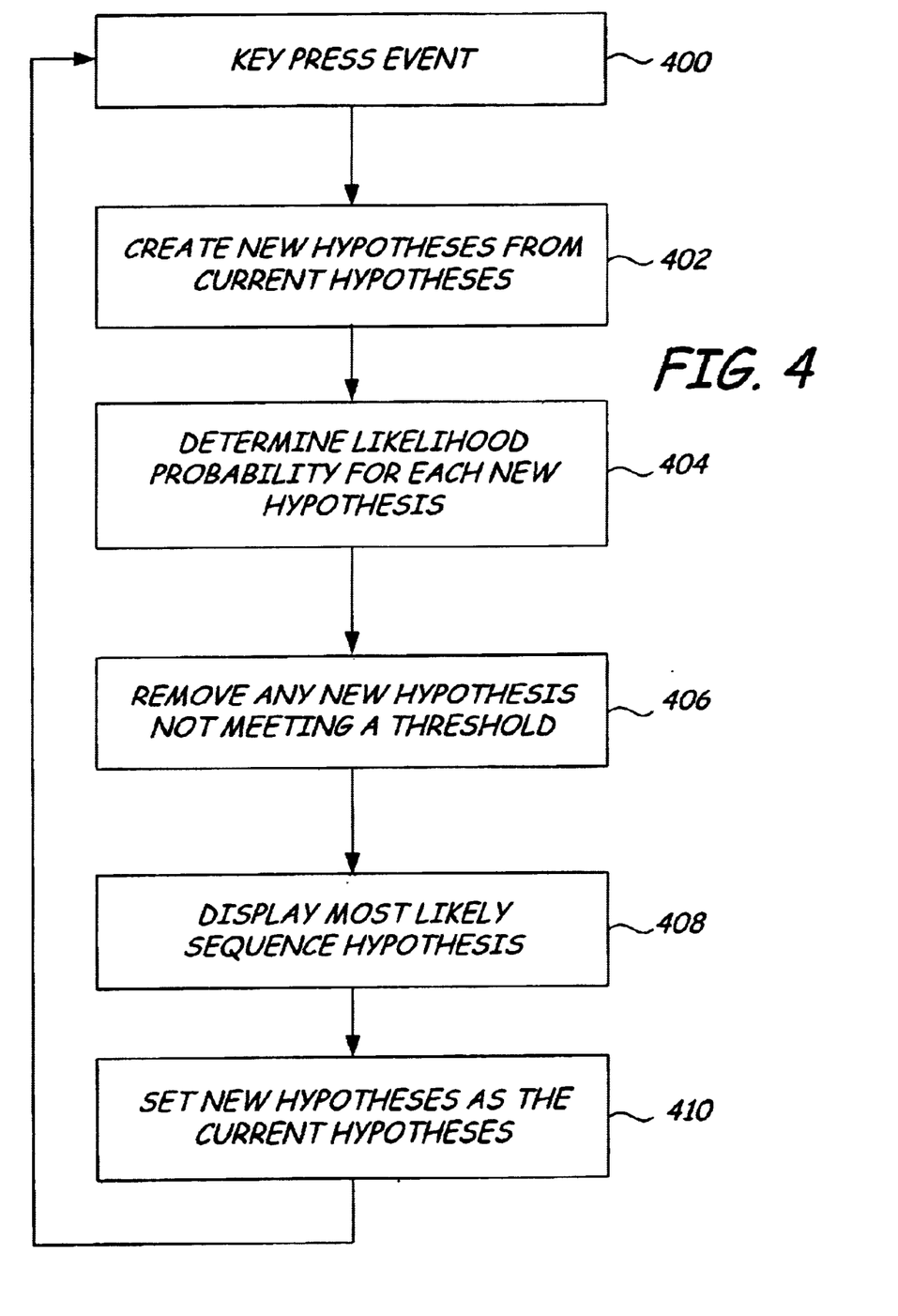
FIG. 4 is a flowchart of a method according to an embodiment of the invention.

In this section of the detailed description, methods according to varying embodiments of the invention are presented. One particular method is shown in the flowchart of FIG. 4. The computer-implemented method is desirably realized at least in part as one or more programs running on a computer—that is, as a program executed from a computer-readable medium such as a memory by a processor of a computer. The programs are desirably storable on a machine-readable medium such as a floppy disk or a CD-ROM, for distribution and installation and execution on another computer. The program or programs can be a part of a computer system or a computer, such as that described in conjunction with FIG. 1 in a previous section of the detailed description. The invention is not so limited, however. Furthermore, the computer, as that term is used herein, is a general term, and is meant to encompass computerized devices such as PDA devices and electronic book devices, in conjunction with which embodiments of the invention may also be practiced.

Referring now to FIG. 4, in 400, a key press event is detected. In the context of a soft keyboard, the key press event can constitute the pressing, or actuation, of a location within the soft keyboard region of a touch-sensitive display of a PDA-type device. In the context of a physical keyboard, the key press event can constitute the pressing, or actuation, of an actual key of the physical keyboard, as such a keyboard is likely to be found with desktop and laptop computers.

In 402, a new list of key sequence hypotheses is created from a current list of key sequence hypotheses. A key sequence hypothesis is a sequence of keys that has already been determined to likely to have been intended to been typed by the user. There is a list of key sequence hypotheses in one embodiment, as opposed to a single key sequence hypothesis, because more than one key sequence hypothesis may be determined to be greater than all of a number of predetermined thresholds, as is described later in this section in conjunction with 406 of FIG. 4. In the first procession through the method of FIG. 4, the current list of key sequence hypotheses is a list of one key sequence hypothesis, which is the null hypothesis—i.e., no keys having been entered.

The new list of hypotheses is created from the current list of hypotheses by extending each current hypothesis by each of one or more keys. For example, in one embodiment, the new list is created by extending each current hypothesis by each alphabetic key, "a", "b", . . . , "z". Thus, if the current and only hypothesis is the null hypothesis, there will be twenty-six hypotheses in the new list of hypotheses, corresponding to the keys "a", "b", . . . , "z". As another example, if the current list of hypotheses includes the hypothesis "th" and the hypothesis "tw", then each of these hypotheses is extended by each of the alphabetic keys, to generate a new list of hypotheses having fifty-two hypotheses, twenty six beginning with "th", and twenty six beginning with "tw".

In 404, the likelihood probability for each of the new list of hypotheses is determined. The likelihood probability for a given key sequence hypothesis corresponds to the probability that the user intended to have typed the given key sequence hypothesis. This determination can be accomplished as described in the previous section of the detailed description, although the invention is not so limited. The likelihood probability can be determined for each new hypothesis by utilizing a statistical model, such as a statistical character or word model, based on one or more attributes and characteristics, including but not limited to: the location of the actuation of the key press event in the case of a soft keyboard; the key actuated of the key press event in the case of a physical keyboard; the typing speed of the user, which acts to lessen the importance of the soft keyboard location or physical keyboard key actuated as typing speed increases, on the theory that as the user types more quickly, his or her accuracy of hitting the desired location or key lessens; and, the context of the key sequence hypothesis, that is, the actual keys making up the current key sequence hypothesis.

In 406, any new hypothesis is removed from the new list of hypotheses that fails to satisfy any of one or more thresholds. For example, in one embodiment, there can be a predetermined cut-off threshold, such that any new hypothesis having a likelihood probability less than this threshold is removed from the new list. In one embodiment, the cut-off threshold is a predetermined percentage (for example, two percent) of the likelihood probability of the most likely new key sequence hypothesis, which is the new hypothesis having the highest likelihood probability as determined in 404. In another embodiment, another threshold is such that any new hypothesis that has keys more than a predetermined number of keys back from the most recent key added in 402 (for example, three or four keys) that differ from the corresponding keys of the most likely hypothesis is removed. For example, if the most likely hypothesis is "throw", any other new hypothesis that does not have as its first three keys "thr" is removed.

In 408, the most likely new key sequence hypothesis of the new list is displayed. For example, in the context of a PDA-type device embodiment, the most likely new key sequence hypothesis is displayed within a text box, such as the text-entry box 204 of FIG. 3. In 410, the new list of key sequence hypotheses is set as the current list of key sequence hypotheses, and the method of FIG. 4 is repeated, beginning at 400.

The method of FIG. 4 is one manner by which a keyboard, either soft or physical, can be made fuzzy in conjunction with an embodiment of the invention. Being "made fuzzy" in this context refers generally to the use of attributes and characteristics such as actual key or location actuated, key sequence hypothesis context, and typing speed, to determine the actual key sequence intended to be entered by the user. The key press event in 400, for example, can be such that only certain keys are made fuzzy. It may be desired that only alphabetic, or only alphanumeric, keys are made fuzzy. In such an instance, a key press event in 400 may only correspond to the typing of such an alphabetic or alphanumeric key, and such that the keys used to create the new list of hypotheses from the current list are only the alphabetic or alphanumeric keys, respectively. Furthermore, not shown in FIG. 4 is that the method can be made to end when a specified key is actuated by the user, such as the enter key, or the space bar. The shift key also can or does not have to be taken into consideration in the method of FIG. 4.

Systems

Figure 5:
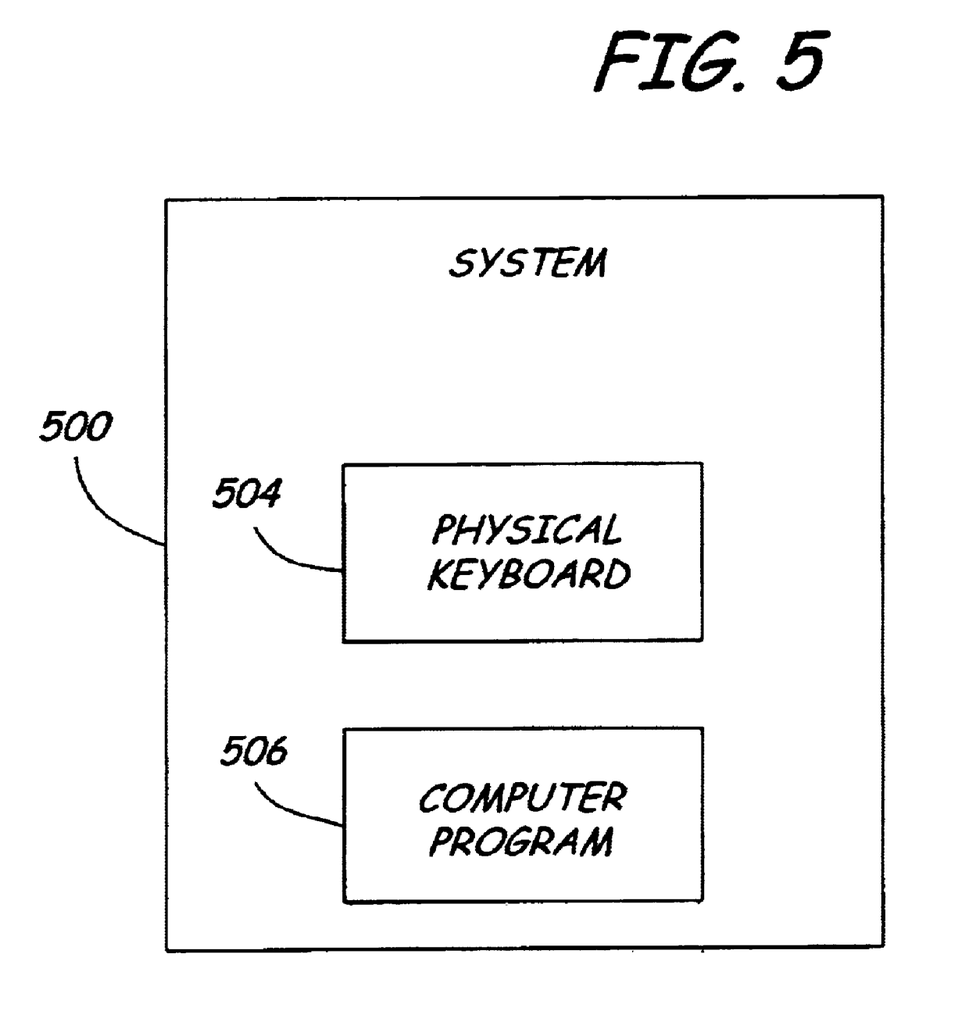
FIG. 5 is a diagram of a system.
Figure 6:
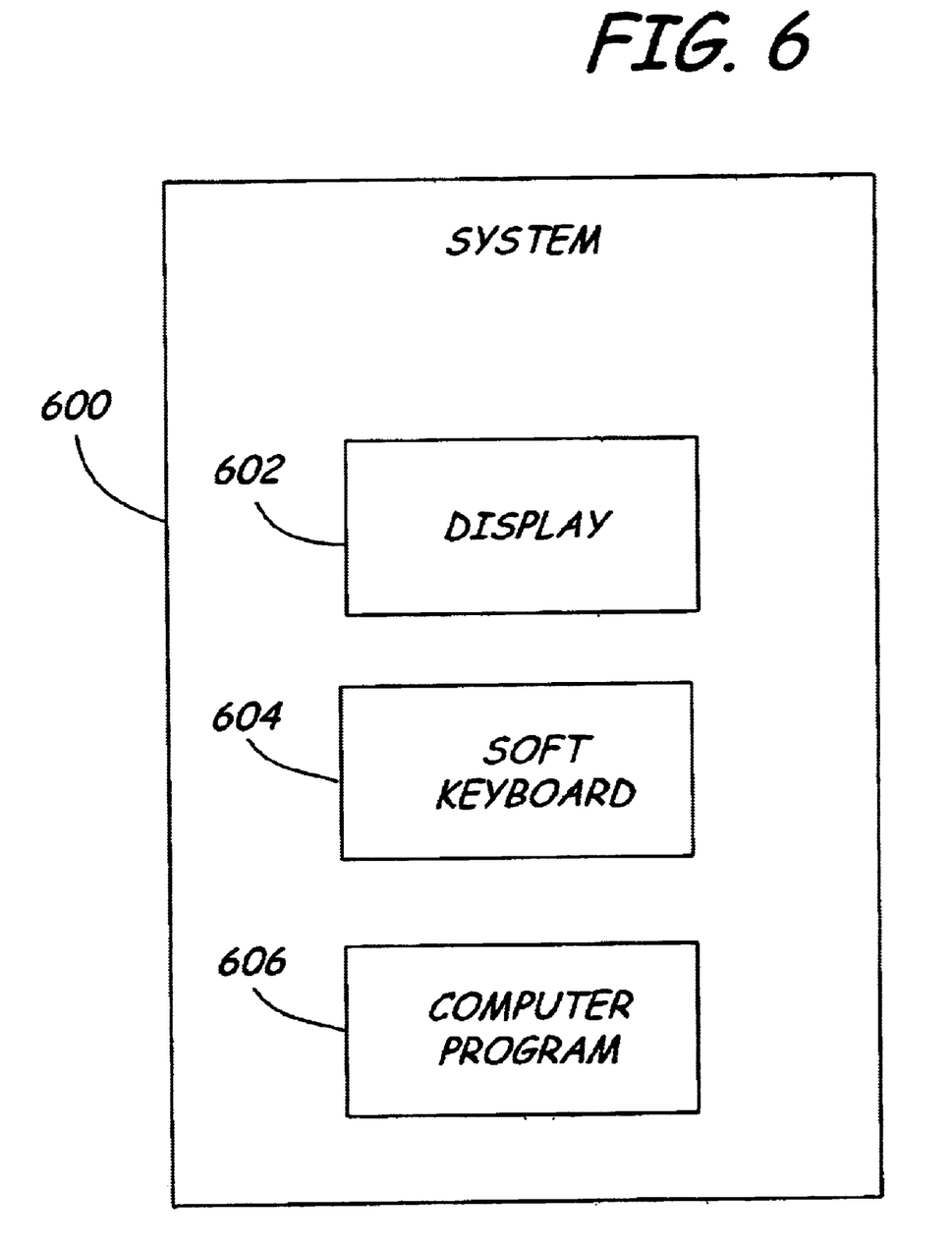
FIG. 6 is a diagram of a system according to an embodiment of the invention.

In this section of the detailed description, systems according to varying embodiments of the invention are described in conjunction with FIGS. 5 and 6, which are diagrams of such systems. Referring first to FIG. 5, the system 500 is an embodiment of the invention having a physical keyboard 504, as opposed to, for example, a soft keyboard. The system 500 therefore may correspond to a laptop or a desktop computer, for example. The system 500 also includes a computer program 506. The keyboard 504 has a plurality of keys, such as alphanumeric and other keys.

The computer program 506 is desirably made up of instructions to be executed by a processor (not shown in FIG. 5) from a machine-readable medium (also not shown in FIG. 5) such as a volatile or non-volatile memory, or other storage such as a hard disk drive. The program 506 detects actuation of a key on the keyboard, and determines a most likely intended-to-be typed key of the keyboard based on at least the key actuated and also one or more of the user's typing speed, the key sequence of keys already determined to have been typed, and a list of key sequence hypotheses, as, for example, as has been described in preceding sections of the detailed description. In one embodiment, the program 506 is considered the means for making this detection and determination.

Referring next to FIG. 6, the system 600 is an embodiment of the invention having a soft keyboard 604, as opposed to, for example, a physical or real keyboard. The system 600 therefore can be implemented as part of a personal-digital-assistant (PDA) device, for example. The system 600 also includes a display 602, and a computer program 606. The soft keyboard 604 is rendered on the display 602.

The computer program 606 is desirably made up of instructions to be executed by a processor (not shown in FIG. 6) from a machine-readable medium (also not shown in FIG. 6), such as a volatile or non-volatile memory, or other storage such as a hard disk drive. The program 606 detects actuation of a location on the soft keyboard, and determines a most likely intended-to-be-typed key of the soft keyboard based on at least the location of the actuation on the soft keyboard, and also one or more of the user's typing speed, the key sequence of keys already determined to have been typed, and a list of key sequence hypotheses, as, for example, as has been described in preceding sections of the detailed description. In one embodiment, the program 606 is considered the means for making this detection and determination.

Pseudo-Code

One embodiment of the invention can be implemented in the pseudo-code that follows, and which is understandable to those of ordinary skill within the art. However, the invention is not limited to this embodiment.

```
Struct Hypothesis {
        String context;
        Float probability;
};
// Let Active be an array of active hypotheses
// Initially, we set it to a single hypothesis,
// with probability 1, and a context of " ",
// since the first letter will probably start a
// new word
```

-continued

```
Array<Hypothesis> Active = Hypothesis (" ", 1.0);
// Now, for every key press at position x, y
// with speed s
for each key press x, y, s
        // Let NewActive be the set of new hypotheses, initially empty
        Array<Hypothesis> NewActive;
        for each hypothesis H in Active
                for each possible key k
                        Float newProbability =
                            H.probability * P(x, y, s | k) * P(k|m.context);
                        NewActive.add(Hypothesis(H.context + k, newProbability));
                next k
        next H
        // Now, threshold out bad hypotheses
        Let m = the most probable hypothesis in NewActive
        Remove all hypotheses from NewActive whose probability is less
            than 0.02 * m.probability
        // Next step optional
        Remove all hypotheses from NewActive for which a letter more
            than four back is different than m.context
        // Avoid underflow (probabilities becoming too low)
        Divide all hypotheses in NewActive by m.probability
        Highlight the last character of m.context on the keyboard
        Display m.context; show any characters which are not the same in
            all hypotheses in NewActive with a different color or font
        Set Active = NewActive
next key press
```

Conclusion

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

We claim:

1. A computer-implemented method comprising:
   upon a key press event, adding each of at least one key to each of a current list of key sequence hypotheses to create a new list of key sequence hypotheses;
   determining a likelihood probability for each of the new list of key sequence hypotheses;
   removing from the new list any key sequence hypothesis failing to satisfy any of at least one threshold; and,
   displaying a most likely key sequence hypothesis of the new list.

2. The method of claim 1, further comprising:
   setting the new list of key sequence hypotheses as the current list of key sequence hypotheses; and,
   repeating the method.

3. The method of claim 1, wherein determining a likelihood probability for each of the new list comprises utilizing a statistical model.

4. The method of claim 3, wherein utilizing a statistical model comprises utilizing one of a statistical character model and a statistical word model.

5. The method of claim 1, wherein determining a likelihood probability for each of the new list comprises determining the likelihood probability for each of the new list based on at least a location of a key press of the key press event on a soft keyboard.

6. The method of claim 5, wherein determining the likelihood probability for each of the new list is further based on at least a typing speed of a user.

7. The method of claim 5, wherein determining the likelihood probability for each of the new list is further based on at least a context of the key sequence hypothesis.

8. The method of claim 5, wherein determining the likelihood probability for each of the new list is further based on at least timing keypress information and a context of the key sequence hypothesis.

9. The method of claim 1, wherein determining a likelihood probability for each of the new list comprises determining the likelihood probability for each of the new list based on at least a key press of the key press event on a physical keyboard.

10. The method of claim 9, wherein determining the likelihood probability for each of the new list is further based on at least timing keypress information of a user.

11. The method of claim 9, wherein determining the likelihood probability for each of the new list is further based on at least a context of the key sequence hypothesis.

12. The method of claim 9, wherein determining the likelihood probability for each of the new list is further based on at least the timing information of the key presses of a user and a context of the key sequence hypothesis.

13. The method of claim 1, wherein removing from the new list any key sequence hypothesis failing to satisfy any of at least one threshold comprises removing any key sequence hypothesis having a likelihood probability less than a predetermined cut-off threshold.

14. The method of claim 13, wherein the predetermined cut-off threshold comprises a predetermined percentage of the likelihood probability of the most likely key sequence hypothesis.

15. The method of claim 1, wherein removing from the new list any key sequence hypothesis failing to satisfy any of at least one threshold comprises removing any key sequence hypothesis having keys more than a predetermined number of keys back from a most recent key that differ from corresponding keys of the most likely key sequence hypothesis.

16. A machine-readable medium having instructions stored thereon for execution by a processor to perform a method comprising:
   upon an actuation of a location within a soft keyboard, adding each of at least one key to each of a current list of key sequence hypotheses to create a new list of key sequence hypotheses;
   determining a likelihood probability for each of the new list of key sequence hypotheses based on at least the location within the soft keyboard of the actuation;

removing from the new list any key sequence hypothesis failing to satisfy any of at least one threshold;

setting the new list of key sequence hypotheses as the current list of key sequence hypotheses; and, repeating the method.

17. The medium of claim 16, wherein the method further comprises prior to setting the new list of key sequence hypothesis as the current list of key sequence hypotheses, displaying a most likely key sequence hypothesis of the new list.

18. The medium of claim 16, wherein determining a likelihood probability for each of the new list of key sequence hypotheses is also based on at least one of: timing keypress information, and a context of the key sequence hypothesis.

19. The medium of claim 16, wherein removing from the new list any key sequence hypothesis failing to satisfy any of at least one threshold comprises removing any key sequence hypothesis having a likelihood probability less than a predetermined cut-off threshold.

20. The medium of claim 16, wherein removing from the new list any key sequence hypothesis failing to satisfy any of at least one threshold comprises removing any key sequence hypothesis having keys more than a predetermined number of keys back from a most recent key that differ from corresponding keys of the most likely key sequence hypothesis.

21. A machine-readable medium having instructions stored thereon for execution by a processor to perform a method comprising:

upon an actuation of a key of a keyboard, adding each of at least one key to each of a current list of key sequence hypotheses to create a new list of key sequence hypotheses;

determining a likelihood probability for each of the new list of key sequence hypotheses based on at least the key of the keyboard of the actuation and a context of the key sequence hypothesis;

removing from the new list any key sequence hypothesis failing to satisfy any of at least one threshold;

setting the new list of key sequence hypotheses as the current list of key sequence hypotheses; and, repeating the method.

22. The medium of claim 21, wherein the method further comprises prior to setting the new list of key sequence hypothesis as the current list of key sequence hypotheses, displaying a most likely key sequence hypothesis of the new list.

23. The medium of claim 21, wherein determining a likelihood probability for each of the new list of key sequence hypotheses is also based on at least timing keypress information of a user.

24. The medium of claim 21, wherein removing from the new list any key sequence hypothesis failing to satisfy any of at least one threshold comprises removing any key sequence hypothesis having a likelihood probability less than a predetermined cut-off threshold.

25. The medium of claim 21, wherein removing from the new list any key sequence hypothesis failing to satisfy any of at least one threshold comprises removing any key sequence hypothesis having keys more than a predetermined number of keys back from a most recent key that differ from corresponding keys of the most likely key sequence hypothesis.

26. A computerized system comprising:

a touch-sensitive display;

a soft keyboard rendered on the display and having a plurality of keys; and, a computer program to detect actuation of a location on the soft keyboard and to determine a most likely intended-to-be-typed key of the soft keyboard based on at least the location on the soft keyboard of the actuation.

27. The system of claim 26, wherein the computer program is to determine the most likely intended-to-be-typed key of the soft keyboard also based on at least one of: timing keypress information of a user; a key sequence of keys already determined to have been typed; and, a list of key sequence hypotheses.

28. The system of claim 26, wherein the soft keyboard is rendered on the display such that boundaries between adjacent keys are fuzzy.

29. The system of claim 26, further comprising:

a processor; and, a machine-readable medium, wherein the computer program is executed by the processor from the machine-readable medium.

30. A machine-readable medium having instructions stored thereon to transform a general-purpose computerized device to a specialized-purpose computerized device comprising:

a soft keyboard; and, means for detecting actuation of a location on the soft keyboard and for determining a most likely intended-to-be-typed key of the soft keyboard based on at least the location on the soft keyboard of the actuation.

31. The medium of claim 30, wherein the most likely intended-to-be-typed key of the soft keyboard is also based on at least one of: a typing speed of a user; a key sequence of keys already determined to have been typed; and, a list of key sequence hypotheses.

32. A computerized system comprising:

a keyboard having a plurality of keys; and, a computer program to detect actuation of a key on the keyboard and to determine a most likely intended-to-be-typed key of the keyboard based on at least the key of the keyboard of the actuation and at least one of a key sequence of keys already determined to have been typed and a list of key sequence hypotheses.

33. The system of claim 32, wherein the computer program is to determine the most likely intended-to-be-typed key of the keyboard also based on at least a typing speed of a user.

34. The system of claim 32, further comprising:

a processor; and, a machine-readable medium, wherein the computer program is executed by the processor from the machine-readable medium.

35. A machine-readable medium having instructions stored thereon to transform a general-purpose computerized device to a specialized-purpose computerized device comprising:

a keyboard having a plurality of keys; and, means for detecting actuation of a key on the keyboard and for determining a most likely intended-to-be-typed key of the keyboard based on at least key of the keyboard of the actuation and at least one of a key sequence of keys already determined to have been typed and a list of key sequence hypotheses.

36. The medium of claim 35, wherein the most likely intended-to-be-typed key of the soft keyboard is also based on at least a typing speed of a user.

* * * * *